United States Patent
Sung et al.

(10) Patent No.: US 10,334,236 B2
(45) Date of Patent: Jun. 25, 2019

(54) SEE-THROUGH TYPE DISPLAY APPARATUS

(71) Applicant: SAMSUNG ELECTRONICS CO., LTD., Suwon-si (KR)

(72) Inventors: Geeyoung Sung, Daegu (KR); Yuntae Kim, Suwon-si (KR); Wontaek Seo, Yongin-si (KR); Juwon Seo, Osan-si (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 172 days.

(21) Appl. No.: 15/403,611

(22) Filed: Jan. 11, 2017

(65) Prior Publication Data
US 2018/0035103 A1   Feb. 1, 2018

(30) Foreign Application Priority Data
Jul. 26, 2016 (KR) .......... 10-2016-0094825

(51) Int. Cl.
| | | |
|---|---|---|
| *G02B 27/01* | (2006.01) | |
| *G02B 27/22* | (2018.01) | |
| *G06T 19/00* | (2011.01) | |
| *H04N 13/337* | (2018.01) | |
| *H04N 13/344* | (2018.01) | |
| *H04N 13/395* | (2018.01) | |

(52) U.S. Cl.
CPC ....... *H04N 13/337* (2018.05); *G02B 27/0101* (2013.01); *G02B 27/0172* (2013.01); *G02B 27/2278* (2013.01); *G06T 19/006* (2013.01); *H04N 13/344* (2018.05); *H04N 13/395* (2018.05); *G02B 2027/014* (2013.01); *G02B 2027/0127* (2013.01); *G02B 2027/0134* (2013.01)

(58) Field of Classification Search
CPC .. H04N 13/337; H04N 13/395; H04N 13/344; G02B 27/0172; G02F 1/137; G02F 2203/12; G06T 19/006
USPC .......................................... 348/53
See application file for complete search history.

(56) References Cited

U.S. PATENT DOCUMENTS

| | | |
|---|---|---|
| 8,547,615 B2 | 10/2013 | Leister |
| 9,354,439 B2 | 5/2016 | Choi et al. |
| 2002/0113752 A1* | 8/2002 | Sullivan .......... G02B 27/2278 345/6 |

(Continued)

FOREIGN PATENT DOCUMENTS

| | | |
|---|---|---|
| JP | 4602369 B2 | 12/2010 |
| KR | 10-2014-0061092 A | 5/2014 |

*Primary Examiner* — Marnie A Matt
(74) *Attorney, Agent, or Firm* — Sughrue Mion, PLLC

(57) ABSTRACT

A see-through type display apparatus includes a spatial light modulator configured to time-sequentially output a multi-layered two-dimensional (2D) image, a depth generator configured to generate a multi-layered depth image having pieces of different depth information from the multi-layered 2D image based on a focal distance that is a distance between the depth generator and a focus point of the multi-layered 2D image; and a light path change member configured to change at least one of a first transmission path of light corresponding to the multi-layered depth image and a second transmission path of external light corresponding to an external image, to thereby transmit the multi-layered depth image and the external image to a same area.

24 Claims, 8 Drawing Sheets

(56) References Cited

U.S. PATENT DOCUMENTS

| | | | |
|---|---|---|---|
| 2006/0028400 A1* | 2/2006 | Lapstun | G02B 26/06 345/8 |
| 2010/0321478 A1* | 12/2010 | Sliwa | G02B 27/2271 348/51 |
| 2012/0147038 A1* | 6/2012 | Perez | G02B 27/0172 345/632 |
| 2012/0249899 A1* | 10/2012 | Berthelot | G02B 3/08 349/13 |
| 2014/0061092 A1 | 3/2014 | Hu | |
| 2014/0347361 A1 | 11/2014 | Alpaslan et al. | |
| 2015/0363978 A1* | 12/2015 | Maimone | G02B 27/0172 345/633 |
| 2016/0187666 A1* | 6/2016 | Manns | G02B 27/2278 359/479 |
| 2016/0253821 A1* | 9/2016 | Romano | G06F 3/017 382/103 |
| 2017/0132970 A1* | 5/2017 | Tang | G09G 3/3208 |
| 2017/0184848 A1* | 6/2017 | Vallius | G02B 3/14 |
| 2018/0122143 A1* | 5/2018 | Ellwood, Jr. | G02B 27/01 |
| 2018/0239177 A1* | 8/2018 | Oh | G02F 1/137 |

\* cited by examiner

SEE-THROUGH TYPE DISPLAY APPARATUS

CROSS-REFERENCE TO RELATED APPLICATION

This application claims priority from Korean Patent Application No. 10-2016-0094825, filed on Jul. 26, 2016 in the Korean Intellectual Property Office, the disclosure of which is incorporated herein in its entirety by reference.

BACKGROUND

1. Field

The present disclosure relates to a display apparatus, and more particularly, to a see-through type display apparatus.

2. Description of the Related Art

Recently, as electronic devices and display apparatuses for realizing virtual reality (VR) have been developed, interest in the electronic devices and the display apparatuses has risen. As a next step of VR, research into technology (e.g., display methods) for realizing augmented reality (AR) and mixed reality (MR) has been conducted.

Unlike VR, which is premised upon a totally artificial environment, AR is a display technology that shows virtual objects or information overlaid (e.g., combined) on a real-world environment, to further augment the effect of reality. While VR may only be applied to certain fields, such as games or virtual experiences, AR can be applied to various real environments. In particular, AR has drawn attention as a next generation display technology suitable for a ubiquitous environment or internet of things (IoT). Since AR shows the real world by combining additional (e.g., virtual) information with the real world, AR may be considered to be an example of MR.

SUMMARY

One or more exemplary embodiments provide see-through type display apparatuses capable of being applied to realize augmented reality (AR) or mixed reality (MR).

Further, one or more exemplary embodiments provide see-through type display apparatuses for displaying a two-dimensional image at different depths.

According to an aspect of an exemplary embodiment, there is provided a see-through type display apparatus including: a spatial light modulator configured to time-sequentially output a multi-layered two-dimensional (2D) image; a depth generator configured to generate a multi-layered depth image having pieces of different depth information from the multi-layered 2D image based on a focal distance that is a distance between the depth generator and a focus point of the multi-layered 2D image; and a light path change member configured to change at least one of a first transmission path of light corresponding to the multi-layered depth image and a second transmission path of external light corresponding to an external image, to thereby transmit the multi-layered depth image and the external image to a same area.

The depth generator may be configured to generate the multi-layered depth image by varying the focal distance over time.

The depth generator may be configured to generate the multi-layered depth image by varying the focal distance at a speed that corresponds to a frame speed of the spatial light modulator.

The depth generator may include: a polarization member configured to change a polarization state with respect to the multi-layered 2D image; and a focal point varying member configured to vary the focal distance according to the polarization state.

The polarization member may include a liquid crystal.

The polarization member may be configured to change the polarization state in correspondence to an applied electrical signal.

The polarization member may be configured to change the polarization state at a speed that corresponds to a frame speed of the spatial light modulator.

The focal point varying member may have an anisotropic property.

The focal point varying member may include a bi-refractive lens.

The depth generator may include each of the polarization member and the focal point varying member in a multiple number.

The polarization members and the focal point varying members may be alternately arranged one-dimensionally.

The depth generator may be configured to form the multi-layered depth image between the depth generator and the light path change member.

The light path change member may include at least one of a beam splitter and a transflective film.

The light path change member may include a first area and a second area having a curved surface contacting the first area.

The surface may be coated with a reflective material.

The spatial light modulator may include: a first spatial light modulator configured to output a first multi-layered 2D image that is the multi-layered 2D image; and a second spatial light modulator configured to output a second multi-layered 2D image.

The see-through type display apparatus may further include another light path change member configured to change at least one of a third transmission path of light corresponding to the first multi-layered 2D image, and a fourth transmission path of light corresponding to the second multi-layered 2D image, to thereby transmit the first and second multi-layered 2D images to the depth generator.

The first spatial light modulator may be arranged opposite to a first surface of the other light path change member, and the second spatial light modulator may be arranged opposite to a second surface of the other light path change member, which is perpendicular to the first surface.

The other light path change member may differently change polarization states of the first multi-layered 2D image and the second multi-layered 2D image.

A distance between the first spatial light modulator and the first surface may be different from a distance between the second spatial light modulator and the second surface.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
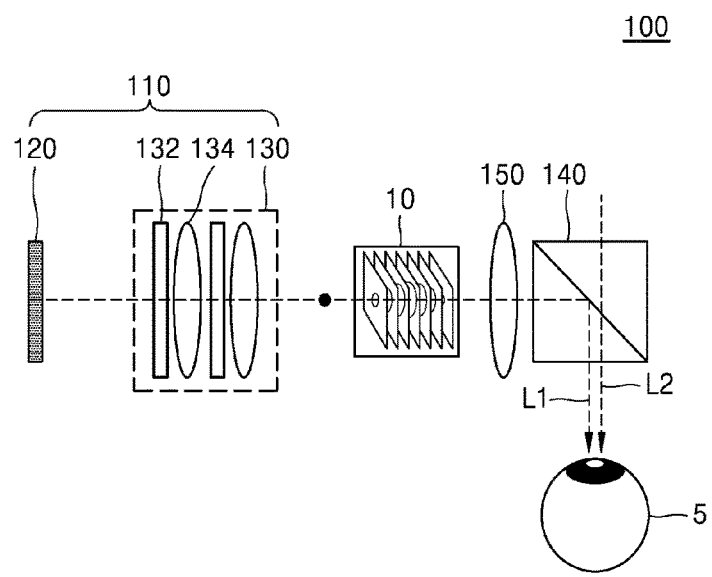
FIG. 1 is a schematic view of a see-through type display apparatus according to an exemplary embodiment.

Reference will now be made in detail to a see-through type display apparatus and an electronic device including the same according to exemplary embodiments, examples of which are illustrated in the accompanying drawings, wherein like reference numerals refer to like elements throughout. In the drawings, the thicknesses of layers and regions and the sizes of components may be exaggerated for clarity and convenience of description. Expressions such as "at least one of," when preceding a list of elements, modify the entire list of elements and do not modify the individual elements of the list.

It will be further understood that when a part "includes" or "comprises" an element, unless otherwise defined, the part may further include other elements, and does not exclude the other elements. Also, it is understood that a part does not necessarily include or comprise all of a plurality of components or operations described in the specification. Some of the components or operations may not be included the part.

Hereinafter, when an element is described as being "above", "on", "under", "left", or "right" of another element, this description may not only denote that the element is directly above, on, under, left, or right of the other element, but may also denote that the element is indirectly above, on, under, left, or right of the other element. Hereinafter, exemplary embodiments will be described in detail with reference to the accompanying drawings.

FIG. 1 is a schematic view of a see-through type display apparatus 100 according to an exemplary embodiment.

Referring to FIG. 1, the see-through type display apparatus 100 may include a depth image generator 110 for generating a multi-layered depth image 10 having pieces of different depth information from a multi-layered two-dimensional (2D) image. Here, the multi-layered 2D image may be a 2D image, in which 2D images respectively corresponding to pieces of depth information may be sequentially displayed or output at the same point, and the multi-layered depth image 10 may be sequentially displayed or formed at different points (for example, forming points) according to depth information.

The depth image generator 110 may include a spatial light modulator 120 for outputting the multi-layered 2D image, and a depth generator 130 for generating the multi-layered depth image 10 having the pieces of different depth information from the multi-layered 2D image by using a focal distance. The spatial light modulator 120 may time-sequentially output the multi-layered 2D image.

The spatial light modulator 120 may include an amplitude modulation spatial light modulator, a phase modulation spatial light modulator, or a complex spatial light modulator modulating both amplitude and phase. Also, the spatial light modulator 120 may include a transmission light modulator, a reflective light modulator, or a transflective light modulator. As a detailed example, the spatial light modulator 120 may include a liquid crystal on silicon (LCoS) panel, a liquid crystal display (LCD) panel, a digital light projection (DLP) panel, an organic light-emitting diode (OLED) panel, etc. Here, the DLP panel may include a digital micro-mirror device (DMD).

The depth generator 130 may vary a location where the multi-layered 2D image is formed by using a focal distance. The depth generator 130 may include a polarization member 132 for varying a polarization state of light corresponding to an image output from the spatial light modulator 120, and a focal point varying member 134 for varying a focal distance according to the polarization state.

The polarization member 132 may change a polarization state of light by changing a phase of light transmitted according to an applied electrical signal. The polarization member 132 may include a liquid crystal modulator including a liquid crystal layer, an electrode, a polarizing plate, etc. The liquid crystal layer may include ferroelectric liquid crystal molecules capable of changing the polarization state at a high speed. For example, when a first electrical signal is applied to the polarization member 132, incident light may be emitted by being changed into a first polarization state (for example, P polarization), and when a second electrical signal is applied to the polarization member 132, incident light may be emitted by being changed into a second polarization state (for example, S polarization).

Since the polarization member 132 may change the polarization state of light via an electrical signal, a polarization speed may be high. The polarization speed of the polarization member 132 may correspond to a frame speed of the spatial light modulator 120. For example, the polarization speed may be the same as the frame speed.

The focal point varying member 134 may vary the focal distance according to the polarization state of light. The focal point varying member 134 may include a material having an anisotropic property having different refractive indices according to the polarization state of light. For example, the focal point varying member 134 may be a bi-refractive lens. The polarization member 132 and the focal point varying member 134 may be sequentially arranged in a direction of a transmission path of light corresponding to the multi-layered 2D image. That is, the polarization member 132 may be arranged between the spatial light modulator 120 and the focal point varying member 134.

When the depth generator 130 includes a pair of the polarization members 132 and a varying member, the depth generator 130 may have two focal distances. Also, when the depth generator 130 includes n pairs of the polarization members 132 and the varying member, the depth generator 130 may have a focal distance of $2^n$. When the polarization member 132 and the varying member are provided in a multiple number, the polarization members 132 and the varying members may be alternately arranged in a direction extending away from the spatial light modulator 120.

The depth generator 130 may generate the multi-layered depth image 10 having the same number of pieces of depth information as the number of focal distances, and the multi-layered depth image 10 may be formed between a first light path change member 140 to be described later and the depth generator 130.

As described with reference to FIG. 1, the depth generator 130 includes the polarization member 132 and the focal point varying member 134. However, exemplary embodiments are not limited thereto. The depth generator 130 may include light devices capable of generating multi-focal distances. For example, the depth generator 130 may include a deformable membrane mirror device (DMMD), a focal point varying lens, etc.

The see-through type display apparatus 100 may further include the first light path change member 140 for changing at least one of a first light path L1 of light corresponding to the multi-layered depth image 10, and a second light path L2 of external light, and transmitting the multi-layered depth image 10 and an external image corresponding to the external light to one area. Here, the area may be an ocular organ of a user, that is, an eye. In FIG. 1, reference numeral 5 indicates a pupil. The first light path change member 140 may transmit a plurality of images according to a plurality of light paths to the pupil of the user. For example, the first light path change member 140 may transmit and guide the light corresponding to the multi-layered depth image 10 of the first light path L1 and the external light corresponding to the external image of the second light path L2 to the ocular organ of the user.

The light of the first light path L1 may be light which is reflected by the first light path change member 140, and the light of the second light path L2 may be light which has been transmitted through the first light path change member 140. The first light path change member 140 may be a transflective member having both light transmission and light reflection properties. As a detailed example, the first light path change member 140 may include a beam splitter or a transflective film. FIG. 1 illustrates that the first light path change member 140 is a beam splitter. However, the first light path change member 140 may be modified in various ways from the configuration shown in FIG. 1.

The multi-layered depth image 10 transmitted via the light of the first light path L1 may be an image formed and provided in the see-through type display apparatus 100. The multi-layered depth image 10 may be a display image including virtual reality or virtual information. The external image transmitted via the light of the second light path L2 may be an image of an external environment that the user faces via the see-through type display apparatus 100. The external image may include a front view that the user faces and a background subject. Such an external image may be an image of the real world. Thus, the see-through type display apparatus 100 according to the present exemplary embodiment may be applied to realize augmented reality (AR) or mixed reality (MR).

The see-through type display apparatus 100 may further include a field lens 150 focusing the formed multi-layered depth image 10. The field lens 150 may be arranged between the formed multi-layered depth image 10 and the first light path change member 140. Thus, the field lens 150 may focus the formed multi-layered depth image 10 to an ocular organ of the user. In addition, the see-through type display apparatus 100 may further include various types of lenses.

Figure 2:
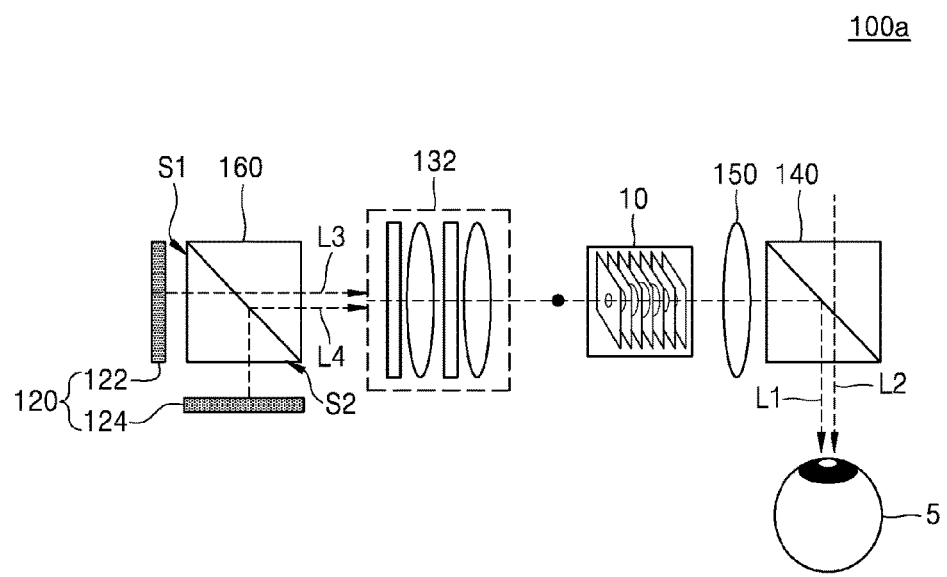
FIG. 2 is a view of an example of a see-through type display apparatus including a plurality of spatial light modulators.

FIG. 2 is a view of an example of a see-through type display apparatus 100a including a plurality of spatial light modulators, for example, first and second spatial light modulators 122 and 124.

Comparing FIG. 1 with FIG. 2, the see-through type display apparatus 100a of FIG. 2 may include the plurality of spatial light modulators, for example, the first and second spatial light modulators 122 and 124. For example, the see-through type display apparatus 100a of FIG. 2 may include the first spatial light modulator 122 outputting a first multi-layered 2D image and the second spatial light modulator 124 outputting a second multi-layered 2D image. Also, the see-through type display apparatus 100a may further include a second light path change member 160 for changing at least one of a third light path L3 of light corresponding to the first multi-layered 2D image and a fourth light path L4 of light corresponding to the second multi-layered 2D image and transmitting the first multi-layered 2D image and the second multi-layered 2D image to the depth generator 130. For example, the second light path change member 160 may transmit the first multi-layered 2D image to the depth generator 130 therethrough and may reflect the second multi-layered 2D image to the depth generator 130.

The first spatial light modulator 122 may be arranged on a first surface S1 of the second light path change member 160 and the second spatial light modulator 124 may be arranged on a second surface S2 of the second light path change member 160, which is different from the first surface S1. Here, the second surface S2 may be a surface perpendicular to the first surface S1. FIG. 2 illustrates two spatial light modulators 122 and 124. However, the exemplary embodiments are not limited thereto. When the second light path change member 160 is a polyhedron, a spatial light modulator may be arranged on any surface except a surface facing the depth generator 130. For example, when the second light path change member 160 is a hexahedron, five spatial light modulators may be arranged. When the plurality of spatial light modulators are used as described above, the multi-layered depth image 10 may be generated to have a greater sense of reality.

Also, a distance between the first spatial light modulator 122 and the second light path change member 160 may be different from a distance between the second spatial light modulator 124 and the second light path change member 160. When the distances are different from each other as described above, a point where the first multi-layered 2D image output from the first spatial light modulator 122 is formed and a point where the second multi-layered 2D image output from the second spatial light modulator 124 is formed may be different from each other.

The second light path change member 160 may be integral with the polarization member 132. For example, the second light path change member 160 may include a polarization beam splitter. The polarization beam splitter may reflect light having a first polarization direction and transmit light having a second polarization direction. Thus, when the polarization beam splitter is used, an additional polarization member may not be included. Alternatively, when the depth generator 130 includes a plurality of polarization members 132 and a plurality of focal point varying members 134, the number of polarization members 132 may be less than the number of focal point varying members 134.

Figure 3:
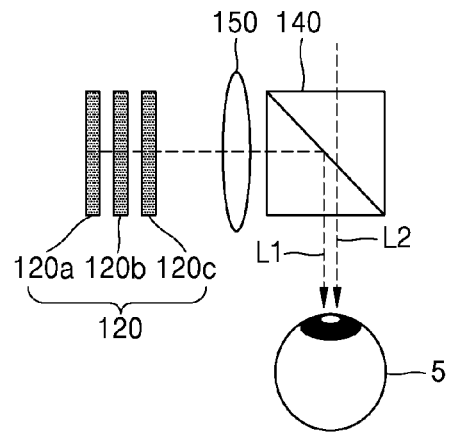
FIG. 3 is a view of an example of a see-through type display apparatus capable of generating a multi-layered depth image by using only a plurality of spatial light modulators.

FIG. 3 is a view of an example of a see-through type display apparatus 100b capable of generating the multi-layered depth image 10 by using only a plurality of spatial light modulators 120a, 120b, and 120c. Referring to FIG. 3, the see-through type display apparatus 100b may generate the multi-layered depth image 10 by the arrangement of the plurality of spatial light modulators 120a, 120b, and 120c. For example, the plurality of spatial light modulators 120a, 120b, and 120c may be arranged one dimensionally in a direction of the first light path L1. The number of spatial light modulators 120a, 120b, and 120c may be the same as the number of pieces of depth information. The plurality of spatial light modulators 120a, 120b, and 120c may be a projection type. For example, the plurality of spatial light modulators 120a, 120b, and 120c may be transparent OLEDs.

Also, the spatial light modulators 120a, 120b, and 120c described above may time-sequentially output an image having different brightnesses according to the depth information. For example, when an image has relatively larger depth information, an image of a relatively lower brightness may be output. Here, large depth information may denote a depth image which is farther than other depth images based on an ocular organ of a user, in the formed multi-layered depth image.

Figure 4:
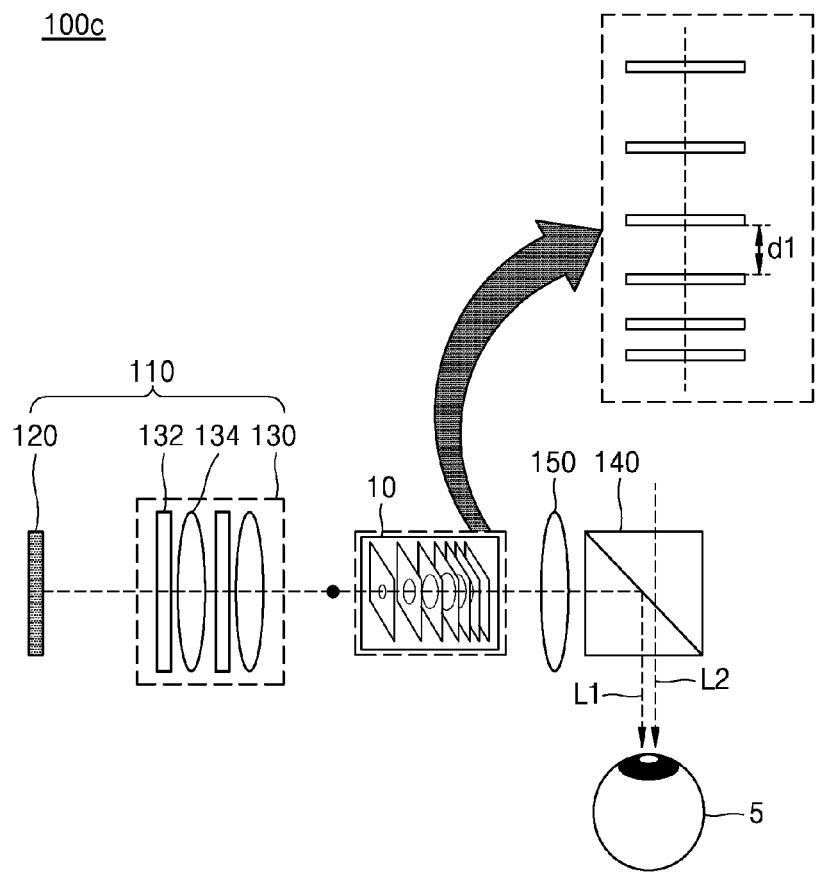
FIG. 4 is a reference view for describing a distance between depth images, according to an exemplary embodiment.

Also, the depth generator 130 may adjust a focal distance such that a distance between the depth image varies according to the ocular organ of the user. For example, the distance between the depth images may be shorter as the depth images are closer to the ocular organ of the user. FIG. 4 is a reference view for describing a distance d1 between depth images, according to an exemplary embodiment. As illustrated in FIG. 4, the distance d1 between the depth images may become shorter as the depth images become closer to the ocular organ of the user.

Figure 5:
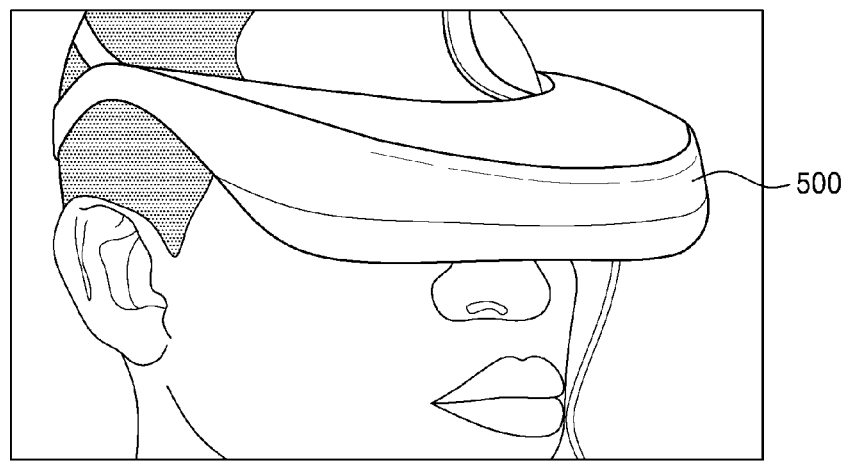
FIGS. 5, 6, and 7 are views of various electronic devices to which a see-through type display apparatus may be applied, according to exemplary embodiments.
Figure 6:
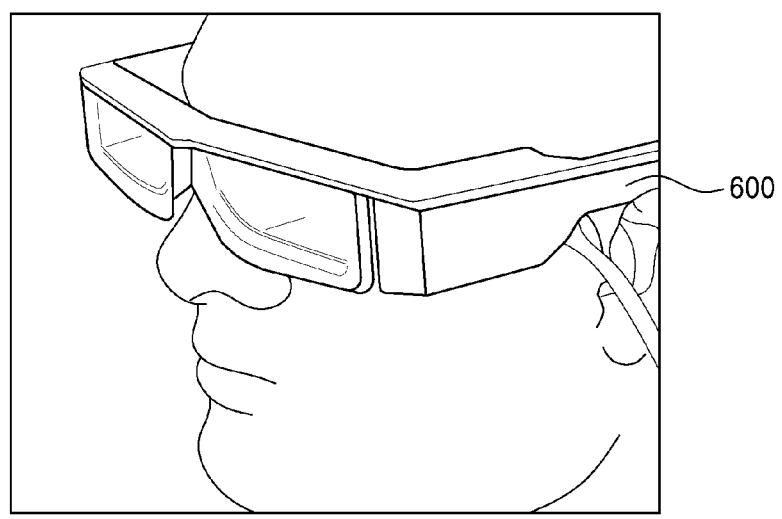
Figure 7:
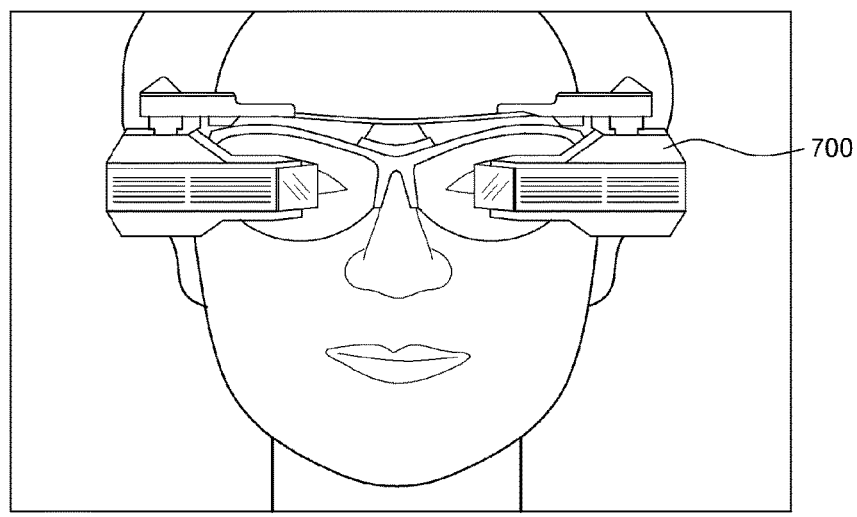

The see-through type display apparatuses 100, 100a, 100b, and 100c described above may be implemented as a component of a wearable device. For example, the see-through type display apparatuses 100, 100a, 100b, and 100c may be applied to a head mounted display (HMD). Also, the see-through type display apparatuses 100, 100a, 100b, and 100c may be applied to a glasses-type display or a goggle-type display. Wearable electronic devices may operate in synchronization (or in connection) with smart phones. FIGS. 5, 6, and 7 are views of various electronic devices to which the see-through type display apparatuses 100, 100a, 100b, and 100c according to the exemplary embodiments may be applied. The electronic devices of FIGS. 5, 6, and 7 may be a head mounted display (HMD) 500 (see FIG. 5), a glasses-type display 600 (see FIG. 6), or a modified head mounted display 700 (see FIG. 7), as well as many other types of electronic devices.

Figure 8:
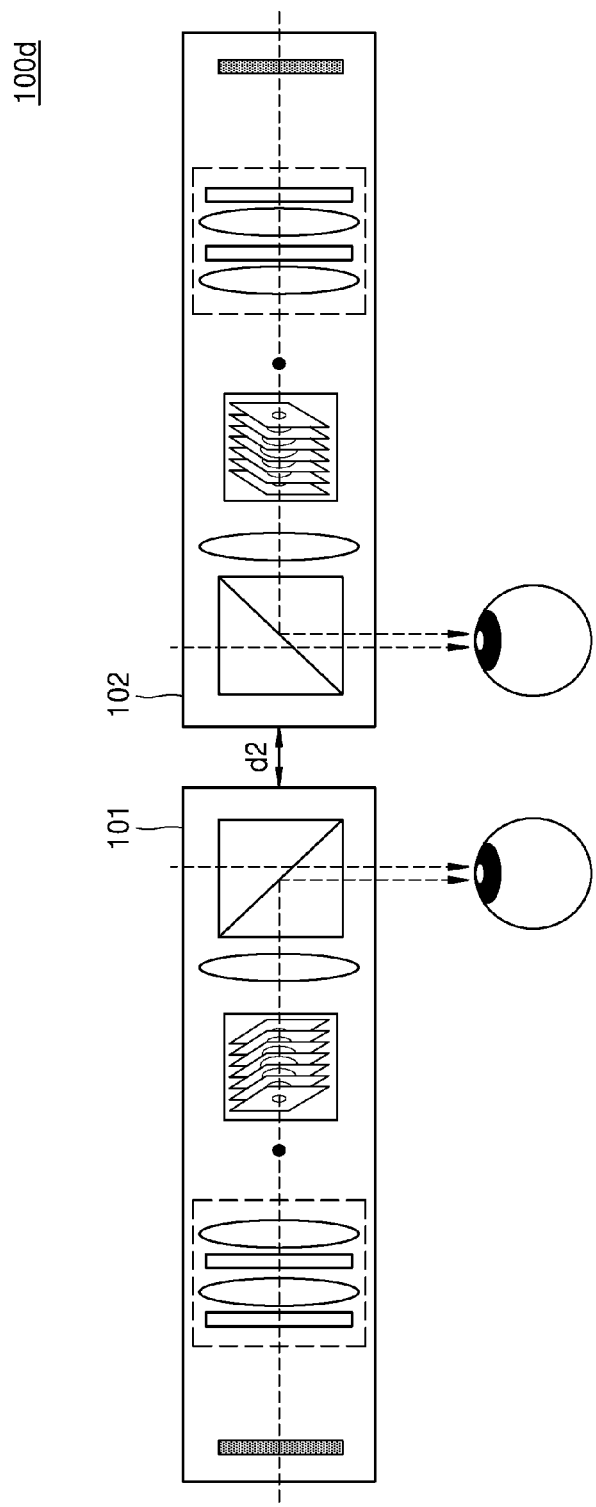
FIG. 8 is a view of an example of a see-through type display apparatus applied to a head set.

FIG. 8 is a view of an example of a see-through type display apparatus 100d applied to a head set. As illustrated in FIG. 8, the see-through type display apparatus 100d may include a first see-through type display apparatus 101 arranged on the left eye of a user and a second see-through type display apparatus 102 arranged on the right eye of the user. A distance d2 between the first see-through type display apparatus 101 and the second see-through type display apparatus 102 may be adjusted according to a distance between the left and right eyes of the user.

Figure 9:
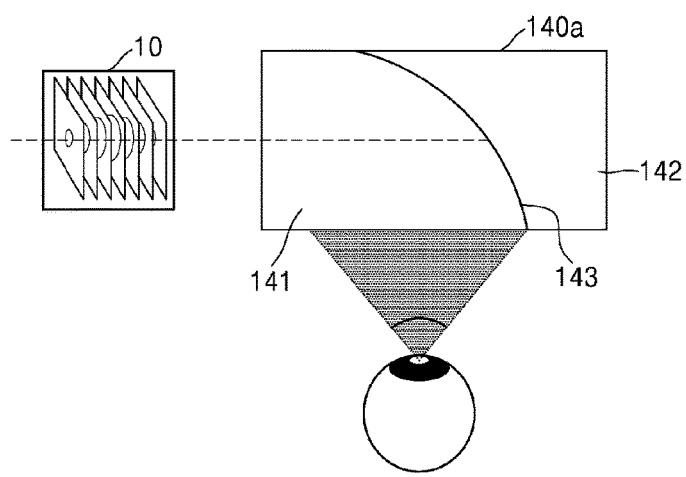
FIGS. 9 and 10 are views of a see-through type display apparatus including a first light path change member having a wide angle of view, according to an exemplary embodiment.
Figure 10:
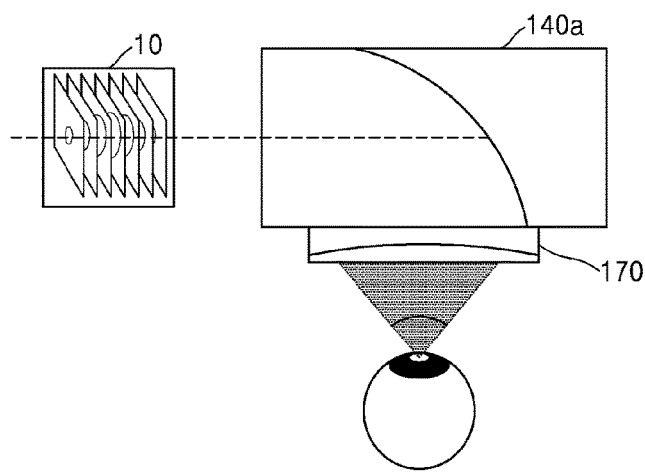

FIGS. 9 and 10 are views of a see-through type display apparatus including a first light path change member 140a having a wide angle of view, according to an exemplary embodiment. The first light path change member 140a illustrated in FIG. 9 may include a plurality of areas including different mediums. For example, the first light path change member 140a may include a first area 141 and a second area 142 having an edge contacting the first area 141, the edge being a curved surface 143. The center of curvature of the curved surface 143 may be in an area near to the multi-layered depth image 10. Further, the curved surface 143 may further be coated with a reflective material. Thus, the user may identify a wider external image.

Alternatively, as illustrated in FIG. 10, a lens 170 may further be arranged between the first light path change member 140a and the ocular organ of the user. The lens 170 is arranged close to the ocular organ, and thus, a focal distance of the lens 170 may be short with respect to a diameter of the lens 170. As a result, a wide angle of view may be easily obtained. The lens 170 may be an anisotropic lens. In more detail, the lens 170 may be a polarization dependent bi-refractive lens. Thus, the lens 170 may operate as a lens with respect to the multi-layered depth image 10 and operate as a plate with respect to an external image.

Figure 11:
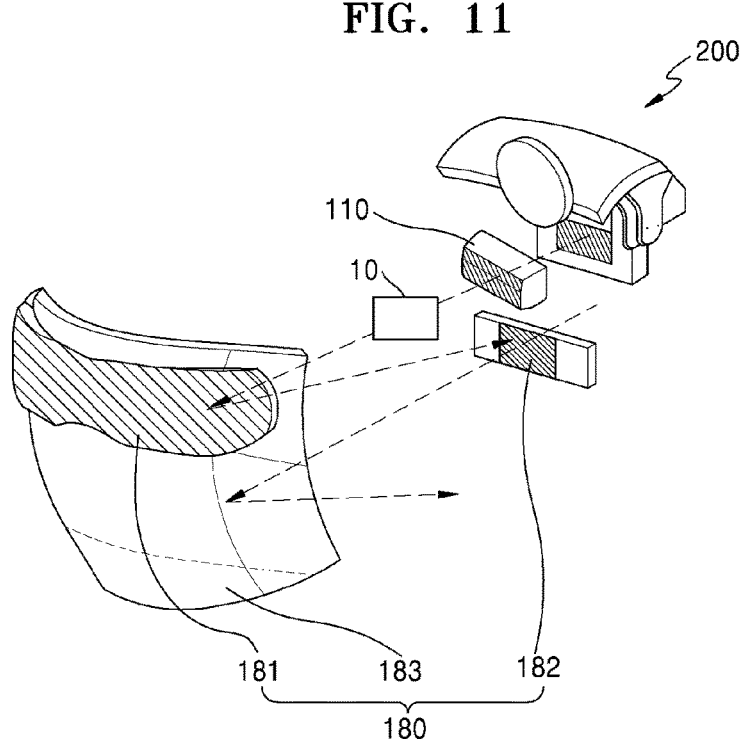
FIG. 11 is a view of a first light path change member including a plurality of mirrors.

FIG. 11 is a view of a first light path change member 180 including a plurality of mirrors 181, 182, and 183. A see-through type display apparatus 200 illustrated in FIG. 11 may be a head-set type. The depth image generator 110 may be arranged above an ocular organ of a user. In order to transmit the multi-layered depth image 10 and an external image to the ocular organ of the user, the first light path change member 180 may include the plurality of mirrors, for example, mirrors 181 and 182 and one transflective mirror 183. For example, the first light path change member 180 may include one or more mirrors 181 and 182 reflecting the multi-layered depth image 10 and at least one transflective mirror 183 transmitting the external image while reflecting the multi-layered depth image 10. As described above, when one or more mirrors 181, 182, and 183 are used as the first light path change member 180, a location where the depth image generator 110 may be arranged may vary.

Figure 12:
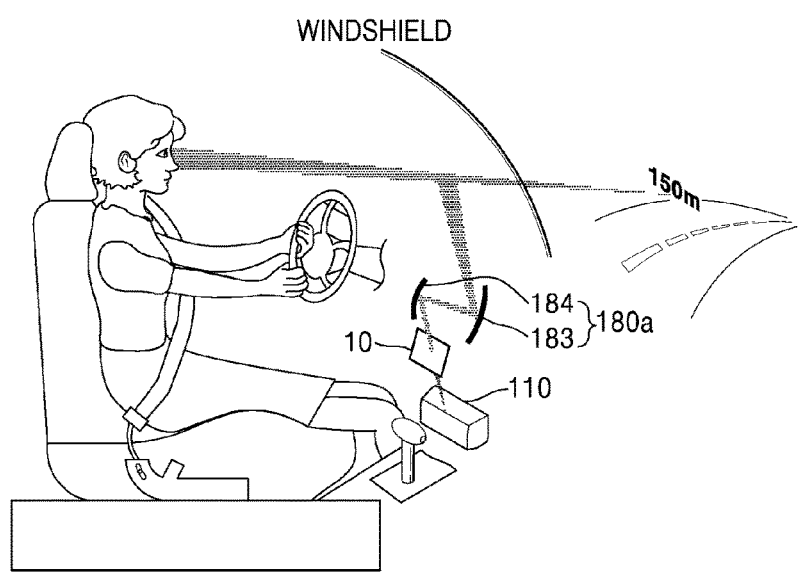
FIG. 12 is a view of an example of a see-through type display apparatus that is applied to a motor vehicle.

FIG. 12 is a view of an example of a see-through type display apparatus applied to a motor vehicle. As illustrated in FIG. 12, when the depth image generator 110 is arranged in an area of the motor vehicle, and one or more mirrors 183 and 184 are used as a first light path change member 180a, the multi-layered depth image 10 and an external image may be transmitted to an ocular organ of a user. The one or more mirrors 183 and 184 may include a fold mirror and an anisotropic mirror.

Figure 13:
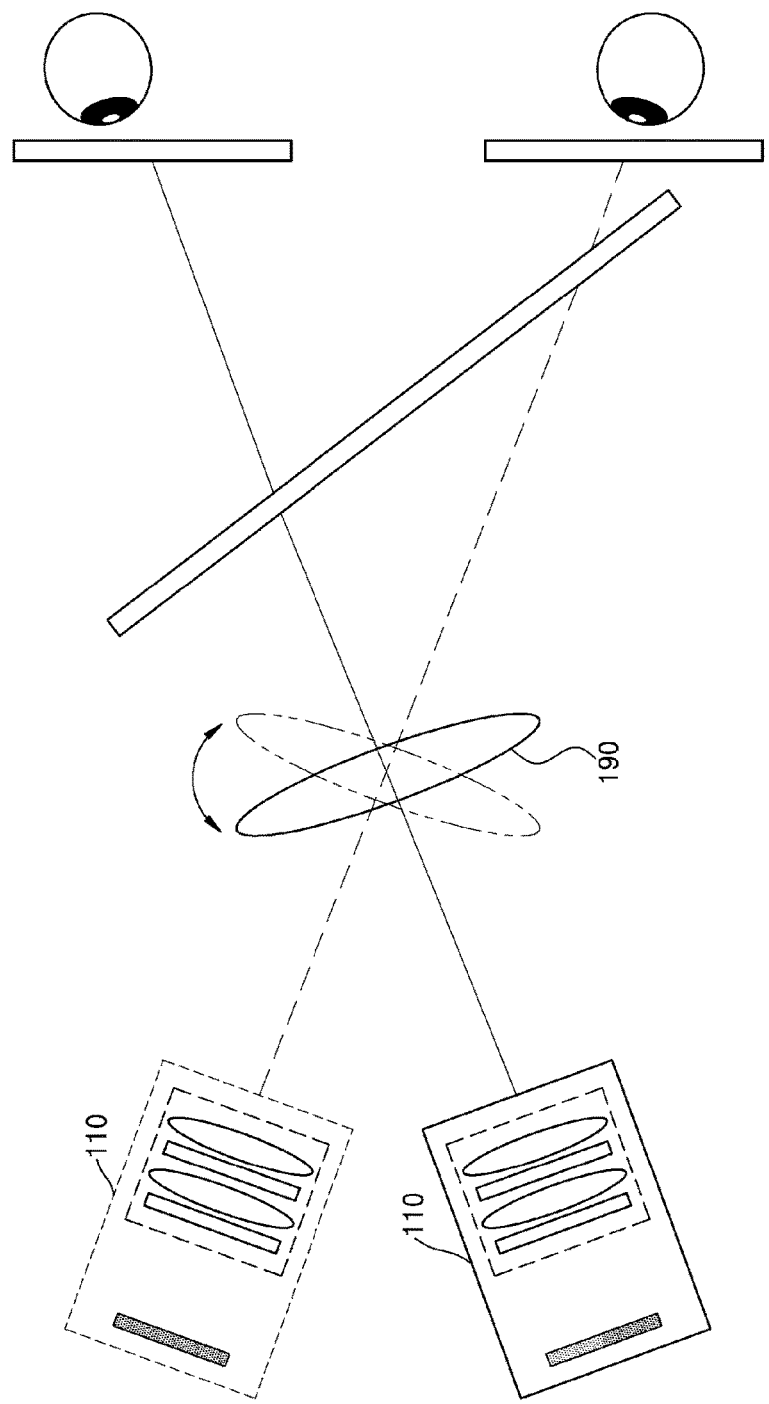
FIG. 13 is a view of an example of a see-through type display apparatus including a steering light member.

A depth image for the right eye and a depth image for the left eye may be generated by using one depth image generator 110. FIG. 13 is a view of an example of a see-through type display apparatus including a steering light member 190. As illustrated in FIG. 13, the formed multi-layered depth image 10 may be selectively transmitted to the right eye or the left eye of a user by using the steering light member 190.

In addition, the see-through type display apparatuses 100, 100a, 100b, and 100c according to the exemplary embodiments of the present application may be applied to various types of electronic devices, as well as to power generating devices, such as vehicles, and furthermore to general infrastructure devices. Fields to which the see-through type display apparatuses 100, 100a, 100b, and 100c according to the exemplary embodiments may be applied may vary. The see-through type display apparatuses 100, 100a, 100b, and 100c may be applied not only to realize AR and MR, but may also be applied to many other types of fields. Furthermore, in addition to the fields of AR and MR, the see-through type display apparatuses 100, 100a, 100b, and 100c according to the exemplary embodiments may be applied to multi-image displays allowing simultaneous viewing of a plurality of images.

According to exemplary embodiments, a see-through type display apparatus applied to realize AR and MR may be realized.

Since a 2D image is displayed at different depths, the image may be displayed to provide a greater sense of reality.

Various electronic devices or other types of optical devices including the see-through type display apparatus may be realized according to exemplary embodiments.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the exemplary embodiments as defined by the following claims.

What is claimed is:

1. A see-through type display apparatus comprising:
   a spatial light modulator configured to time-sequentially output a multi-layered two-dimensional (2D) image;
   a depth generator configured to generate a multi-layered depth image having pieces of different depth information from the multi-layered 2D image based on a focal distance that is a distance between the depth generator and a focus point of the multi-layered 2D image; and
   a light path change member configured to change at least one of a first transmission path of light corresponding to the multi-layered depth image and a second transmission path of external light corresponding to an external image, to thereby transmit the multi-layered depth image and the external image to a same area.

2. The see-through type display apparatus of claim 1, wherein the depth generator is configured to generate the multi-layered depth image by varying the focal distance over time.

3. The see-through type display apparatus of claim 1, wherein the depth generator is configured to generate the multi-layered depth image by varying the focal distance at a speed that corresponds to a frame speed of the spatial light modulator.

4. The see-through type display apparatus of claim 1, wherein the depth generator comprises:
   a polarization member configured to change a polarization state with respect to the multi-layered 2D image; and
   a focal point varying member configured to vary the focal distance according to the polarization state.

5. The see-through type display apparatus of claim 4, wherein the polarization member comprises a liquid crystal.

6. The see-through type display apparatus of claim 4, wherein the polarization member is configured to change the polarization state in correspondence to an applied electrical signal.

7. The see-through type display apparatus of claim 6, wherein the polarization member is configured to change the polarization state at a speed that corresponds to a frame speed of the spatial light modulator.

8. The see-through type display apparatus of claim 4, wherein the focal point varying member has an anisotropic property.

9. The see-through type display apparatus of claim 8, wherein the focal point varying member comprises a bi-refractive lens.

10. The see-through type display apparatus of claim 4, wherein the depth generator comprises each of the polarization member and the focal point varying member in a multiple number.

11. The see-through type display apparatus of claim 10, wherein the polarization members and the focal point varying members are alternately arranged one-dimensionally.

12. The see-through type display apparatus of claim 1, wherein the depth generator is configured to form the multi-layered depth image between the depth generator and the light path change member.

13. The see-through type display apparatus of claim 1, wherein the light path change member comprises at least one of a beam splitter and a transflective film.

14. The see-through type display apparatus of claim 1, wherein the light path change member comprises a first area and a second area having a curved surface contacting the first area.

15. The see-through type display apparatus of claim 14, wherein the curved surface is coated with a reflective material.

16. The see-through type display apparatus of claim 1, wherein the spatial light modulator comprises:
   a first spatial light modulator configured to output a first multi-layered 2D image that is the multi-layered 2D image; and
   a second spatial light modulator configured to output a second multi-layered 2D image.

17. The see-through type display apparatus of claim 16, further comprising another light path change member configured to change at least one of a third transmission path of light corresponding to the first multi-layered 2D image, and a fourth transmission path of light corresponding to the second multi-layered 2D image, to thereby transmit the first and second multi-layered 2D images to the depth generator.

18. The see-through type display apparatus of claim 17, wherein the first spatial light modulator is arranged opposite to a first surface of the other light path change member, and
   the second spatial light modulator is arranged opposite to a second surface of the other light path change member, which is perpendicular to the first surface.

19. The see-through type display apparatus of claim 17, wherein the other light path change member differently changes polarization states of the first multi-layered 2D image and the second multi-layered 2D image.

20. The see-through type display apparatus of claim 18, wherein a distance between the first spatial light modulator and the first surface is different from a distance between the second spatial light modulator and the second surface.

21. The see-through type display apparatus of claim 1, wherein the depth generator is further configured to adjust the focal distance such that a distance between consecutive depth images from among the multi-layered depth image becomes shorter as the consecutive depth images become closer to the same area to which the multi-layered depth image and the external image are transmitted.

22. A display apparatus comprising:
   a plurality of spatial light modulators arranged along a first transmission path of light, the plurality of spatial light modulators configured to modulate the light and thereby output, in a time-sequential manner, a multi-layered depth image based on a two-dimensional (2D) image to be viewed by a user; and
   a light path change member configured to receive the multi-layered depth image and external light corresponding to an external image, and change one of the first transmission path of light and a second transmission path along which the external light is transmitted, to thereby transmit the multi-layered depth image and the external image to the user.

23. The display apparatus of claim 22, wherein the layers of the multi-layered depth image have unique pieces of depth information with respect to the 2D image.

24. The display apparatus of claim 23, wherein a number of the spatial light modulators is equal to a number of the layers.

* * * * *